United States Patent
Lim et al.

(10) Patent No.: US 7,747,063 B2
(45) Date of Patent: Jun. 29, 2010

(54) METHOD AND APPARATUS FOR INSPECTING A SUBSTRATE

(75) Inventors: Jung-Taek Lim, Gyeonggi-do (KR);
Chung-Sam Jun, Gyeonggi-do (KR);
Young-Jee Yoon, Gyeonggi-do (KR);
Sung-Hong Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 995 days.

(21) Appl. No.: 11/463,281

(22) Filed: Aug. 8, 2006

(65) Prior Publication Data

US 2007/0031025 A1 Feb. 8, 2007

(30) Foreign Application Priority Data

Aug. 8, 2005 (KR) .................. 10-2005-0072162

(51) Int. Cl.
*G06K 9/00* (2006.01)
(52) U.S. Cl. ...................................... 382/145
(58) Field of Classification Search .............. 385/145; 382/145
See application file for complete search history.

(56) References Cited

U.S. PATENT DOCUMENTS 7,248,732 B2 * 7/2007 Kuwabara ................... 382/149
7,466,853 B2 * 12/2008 Kim et al. ................... 382/145
2005/0117796 A1 * 6/2005 Matsui et al. ............... 382/145

FOREIGN PATENT DOCUMENTS

| JP | 2003-270168 | 9/2003 |
|---|---|---|
| JP | 2004-144552 | 5/2004 |
| KR | 1999-001667 | 1/1999 |
| KR | 10-2005-0018470 | 2/2005 |

OTHER PUBLICATIONS

English language abstract of Korean Publication No. 1999-001667.
English language abstract of Japanese Publication No. 2003-270168.
English language abstract of Korean Publication No. 10-2005-0018470.

* cited by examiner

*Primary Examiner*—Bhavesh M Mehta
*Assistant Examiner*—Hadi Akhavannik
(74) *Attorney, Agent, or Firm*—Harness, Dickey & Pierce, PLC

(57) ABSTRACT

In an embodiment of a method of inspecting a substrate, the substrate on which minute structures are formed is divided into a plurality of inspection regions. A main inspection region among the inspection regions is selected. A main image of the main inspection region and sub-images of sub-inspection regions adjacent to the main inspection region are obtained. An average image of the main image and the sub-images is obtained. The average image is then compared with the main image to detect defects in the main inspection region. Gray levels may be used. The average image may have improved quality so that the defects in the selected inspection region may be rapidly and accurately detected. This process has an improved reliability. Further, the number of inspecting processes for the substrate may be reduced. And a line for the inspection process may be automated so that a worker-free line may be established.

10 Claims, 6 Drawing Sheets

METHOD AND APPARATUS FOR INSPECTING A SUBSTRATE

CROSS REFERENCE TO RELATED APPLICATION

This application claims priority under 35 U.S.C. §119 to Korean Patent Application No. 2005-72162, filed on Aug. 8, 2005, the contents of which are herein incorporated by reference in their entirety for all purposes.

BACKGROUND OF THE INVENTION

1. Field of the Invention

The present invention relates to a method and apparatus for inspecting a substrate. More particularly, the present invention relates to a method of inspecting a substrate to detect defects on the substrate such as particles or distortions of minute structures, and an apparatus for performing the method.

2. Description of the Related Art

To process large amounts of data in a relatively short time, semiconductor devices are generally highly integrated having a large capacity for the data. During their manufacturing, these semiconductor devices are susceptible to defects such as particles, bridges and sinks. Further, after a chemical mechanical polishing (CMP) process is carried out, defects such as scratches may be generated on a surface of the semiconductor substrate. Thus, an inspection process to determine the presence of defects is an important aspect of the devices' production. And as these semiconductor devices become even more highly integrated, the inspection process becomes more important, but at the same time the inspection for defects becomes more difficult to be accurate. Defect-Inspecting apparatuses are classified as either an optical inspection apparatus that uses a light source or an image-inspecting apparatus that uses a microscope.

An example of a method of inspecting defects using an optical inspection apparatus and a method of manufacturing a semiconductor device is disclosed in Japanese Patent Laid-Open Publication No. 2003-270168 (filed by SEIKO EPSON CORP., Sep. 25, 2003). According to the above Japanese Patent, to reduce defect detection errors caused by spots such as a watermark on a semiconductor substrate, values of brightness of a number of inspection regions are averaged to calculate a reference brightness of all the inspection regions.

An image-inspecting apparatus mainly uses a scanning electron microscope (SEM). A method of inspecting defects using the SEM is classified as either a single frame-comparing type apparatus or a golden image-comparing type apparatus.

According to the single frame-comparing type apparatus, an image of an inspection region is compared with an image of an adjacent inspection region to recognize whether there are defects in the inspection region. However, if similar defects are in the adjacent inspection region as well as the inspection region, these defects may be difficult to detect. To overcome the above-mentioned problem of the single frame-comparing type method, the golden image-comparing type method is proposed.

The golden image-comparing type method utilizes images of a plurality of regions on which minute structures substantially similar to those on an inspection region are formed. These images are added to or subtracted from one another to obtain a golden image. The golden image is compared with an image of the inspection region to recognize whether defects exist in the inspection region. Although the golden image-comparing type method has good detection accuracy compared to that of the single frame-comparing type method, there is a problem, however, in that noise is included in the golden image. Particularly, a minute structure on a central portion of a semiconductor substrate has characteristics different from that on a peripheral portion of the semiconductor substrate. This is caused by a non-planarized surface of the semiconductor substrate and a non-simultaneous formation of the minute structures.

Figure 1:
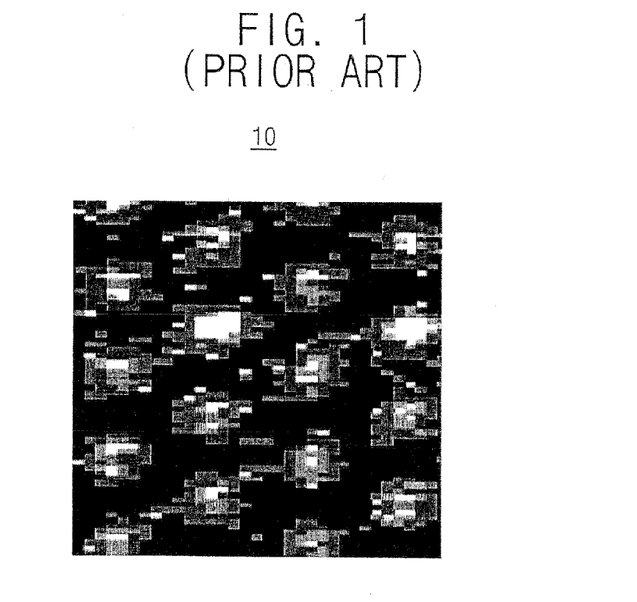
FIG. 1 is a picture illustrating an image obtained using a conventional method of inspecting a substrate.
Figure 2:
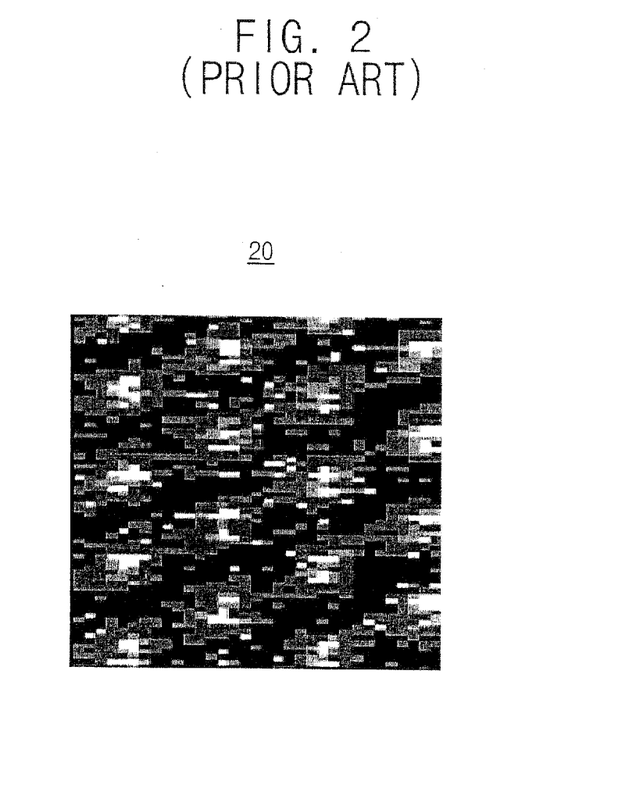
FIG. 2 is a picture illustrating a golden image obtained using a conventional method of inspecting a substrate.

FIG. 1 is a picture illustrating an image of an inspection region obtained using a conventional method of inspecting a substrate, and FIG. 2 is a picture illustrating a golden image obtained using the conventional method of inspecting a substrate.

Referring to FIGS. 1 and 2, when the image 10 of the inspection region is compared with the golden image 20, it can be noted that noise is included in the golden image 20. Although the noise has a relatively low intensity, it may be detected as defects when a set threshold has a low value by subtracting the image 10 of the inspection region from the golden image. Thus, to minimize an influence of the noise, the threshold should be set at a high value. However, when the high threshold is set, it may be higher than an intensity of a signal with respect to actual defects on the inspection region. As a result, the signal with respect to the actual defects on the inspection region is regarded as a signal lower than the threshold so that the actual defects are not detected. Therefore, there is a restriction on setting the high threshold.

Because a semiconductor device is highly integrated, the number of defects that may be detected on a single semiconductor substrate has increased to the thousands. Needless to say, these defects greatly influence many of the semiconductor processes.

Because of the importance of defects and their effects on semiconductors, there is an ever-growing need for improved methods and apparatuses for detecting defects.

SUMMARY OF THE INVENTION

Embodiments of the present invention provide a method of inspecting a substrate that is capable of rapidly and accurately detecting defects on the substrate.

Embodiments of the present invention also provide an apparatus for performing the above-mentioned method.

In a method of inspecting a substrate in accordance with one aspect of the present invention, the substrate on which many repetitive minute structures are formed is divided into a plurality of inspection regions. A main inspection region among the plurality of inspection regions is selected. A main image of the main inspection region and sub-images of sub-inspection regions adjacent to the main inspection region are obtained. An average image of the main image and the sub-images is obtained. The average image is then compared with the main image to detect defects in the main inspection region.

According to one example embodiment, the main image and the sub-images may be obtained using an SEM.

According to another example embodiment, detecting the defects includes calculating an average gray level of the average image and a main gray level of the main image to obtain a difference between the average gray level and the main gray level. A section on the main image where the difference is beyond a predetermined error range is recognized. A position of the substrate corresponding to the section is scrutinized for defects in the main region.

According to still another example embodiment, a plurality of reference inspection regions among all inspection regions is randomly selected. Reference images of the reference inspection regions are then obtained. The reference images are averaged to obtain an average reference image. A difference between the average reference image and the average image is calculated. When the difference is beyond the predetermined error range, the average image is replaced with the average reference image.

According to yet another example embodiment, obtaining the average image includes calculating a main gray level of the main image and sub-gray levels of the sub-images. A maximum gray level or a minimum gray level among the main gray level and the sub-gray levels is selected. Remaining gray levels excluding for the selected gray level are averaged to calculate an average gray level. The average image is obtained from the average gray level.

An apparatus for inspecting a substrate in accordance with another aspect of the present invention includes an image-obtaining unit for obtaining a main image of a main inspection region selected among inspection regions, which are defined on a substrate having minute structures that are repeatedly formed on the substrate, and sub-images of sub-inspection regions adjacent to the main inspection region. A processing unit obtains an average image of the main image and the sub-images. A detecting unit detects defects in the main inspection region by comparing the average image with the main image. Here, the detecting unit may include an SEM.

According to the present invention, the average image compared with the image of the selected inspection region may have improved quality so that the defects in the selected inspection region may be rapidly and accurately detected. Thus, a process for inspecting the substrate may have improved reliability. Further, the number of reviewing processes for inspecting the substrate may be reduced.

BRIEF DESCRIPTION OF THE DRAWINGS

The above and other features and advantages of the invention will become readily apparent by reference to the following detailed description when considered in conjunction with the accompanying drawings, wherein.

DESCRIPTION OF THE EMBODIMENTS

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
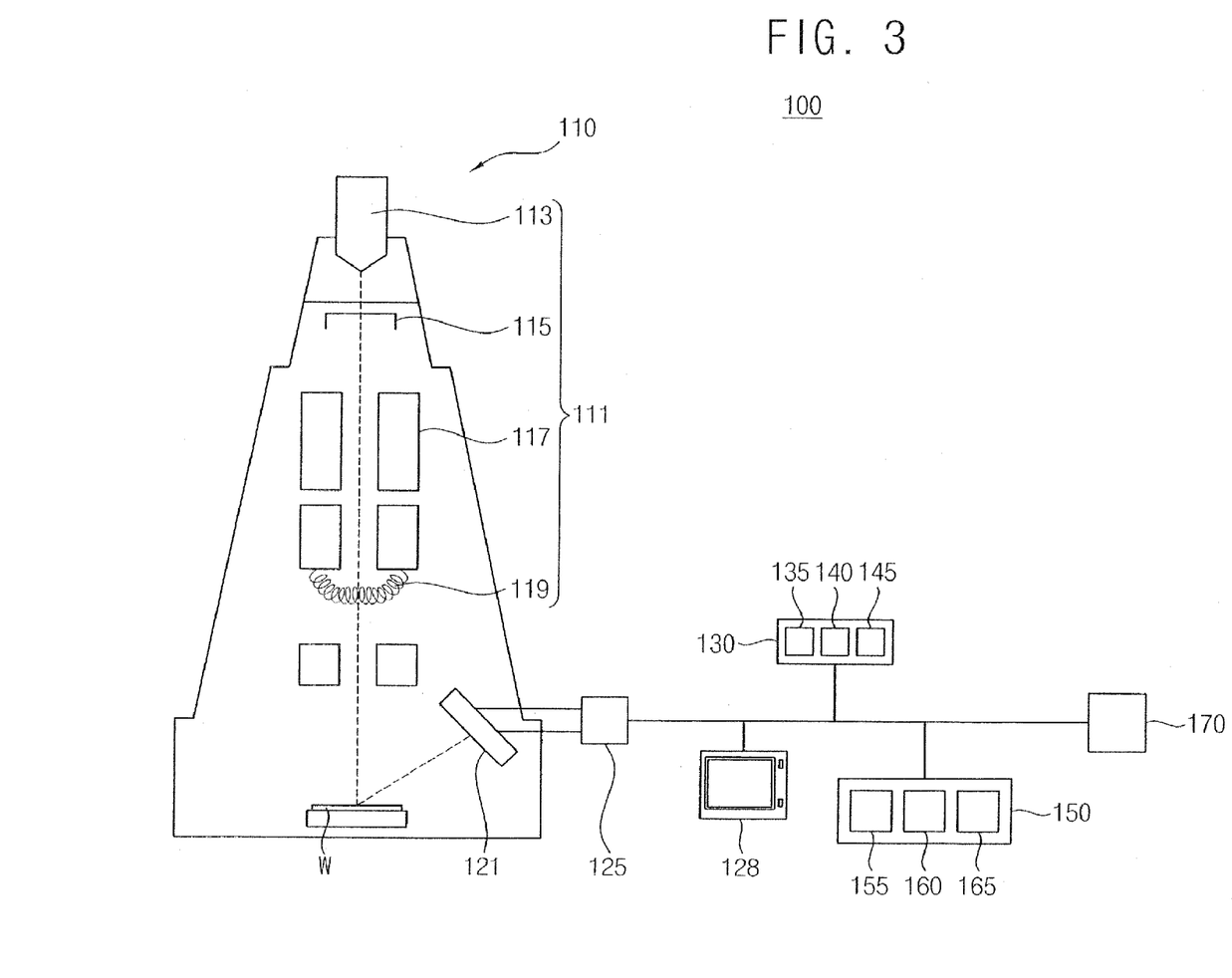
FIG. 3 is a block diagram illustrating an apparatus for inspecting a substrate in accordance with one example embodiment of the present invention.

FIG. 3 is a block diagram illustrating an apparatus for inspecting a substrate in accordance with one example embodiment of the present invention.

FIG. 3 shows an apparatus 100 for inspecting a substrate W and detecting defects on the substrate W. The apparatus 100 includes an image-obtaining unit 10, a processing unit 130, a detecting unit 150 and a memory 170.

Many minute structures, including ones having a repeating pattern, are formed on the substrate W of a memory device or a non-memory device. For example, when a device to be formed on the substrate W corresponds to a memory chip, then repeatedly formed cells may occupy about 70% to 80% of an area of a single die. A non-repeatedly formed peripheral region, a sense amplifier, a sub-word divider, etc., may occupy about 20% to 30% of the area of the single die. When a device to be formed on the substrate W corresponds to a non-memory chip or a system on chip (SOC), then an SRAM, a DRAM, a logic device, a flash memory, etc., are non-repeatedly formed on the single die. That is, a region where the minute structures are repeatedly formed and a region where the minute structures are non-repeatedly formed exist in the memory chip and the non-memory chip. Further, the minute structure in the memory chip and the non-memory chip are spaced apart from each other by various intervals.

When the above-mentioned minute structures are formed on the substrate W, various defects such as particles, scratches, voids, bridges, sinks, etc., may exist. Some defects may have dimensions beyond an allowable dimension, and they may cause operational failures of a semiconductor device. Thus, it is important to carry out an inspection process for detecting the defects on the substrate W. The apparatus 100 is used for performing the inspection process.

The image-obtaining unit 110 obtains an image of a selected inspection region, which is selected among a plurality of inspection regions defined on the substrate W. Also obtained are images of inspection regions adjacent to the selected inspection region. The image-obtaining unit 110 includes an electron emitter 111, a detector 121 and an image processor 125.

The electron emitter 111 includes an electron gun 113, an anode 115, a condenser lens 117 and a scan coil 119. The electron gun 113 generates primary electrons irradiated onto the substrate W. An accelerating voltage of about 20 keV to about 100 keV may be applied to the electron gun 113. The anode 115 accelerates the primary electrons. The condenser lens 117 condenses the accelerated primary electrons onto the substrate W. The scan coil 119 synchronizes the primary electrons to scan the substrate W in a horizontal or vertical direction. Secondary electrons are then emitted from the scanned substrate W. Here, the secondary electrons correspond to an electron ionized from an atom by the primary electrons. Further, an amount of the secondary electrons may vary with a surface state of the substrate W.

As described above, many minute structures are formed on the substrate W. Thus, the amount of the secondary electrons may vary in accordance with structural characteristics of the minute structures. Particularly, the amount of the secondary electrons may vary with an incident angle of the primary electrons with respect to the minute structures, an exposed area of the minute structures with respect to the primary electrons, an interval and an angle between a reflecting face of the minute structures for reflecting the primary electrons, and the detector 121, etc. A large amount of the secondary electrons may be generated from a protruded minute structure compared to a flat surface of the substrate W. This phenomenon is referred to as an edge effect.

The detector 121 collects the secondary electrons. The secondary electrons collected in the detector 121 are transmitted to the processor 125. The processor 125 processes the secondary electrons to convert the secondary electrons into image data. The image data is transmitted to a display panel 128. As a result, an image is exhibited on the display panel 128.

The above-mentioned operational principle of the image-obtaining unit 110 is substantially similar to that of an SEM. Thus, in an embodiment, an SEM may be used for the image-obtaining unit 10.

The image (hereinafter, referred to as a main image) of the selected inspection region (hereinafter, referred to as a main inspection region) and the images (hereinafter, referred to as sub-images) of inspection regions adjacent to the selected inspection region (hereinafter, referred to as sub-inspection regions) are obtained using the image-obtaining unit 110.

Figure 4:
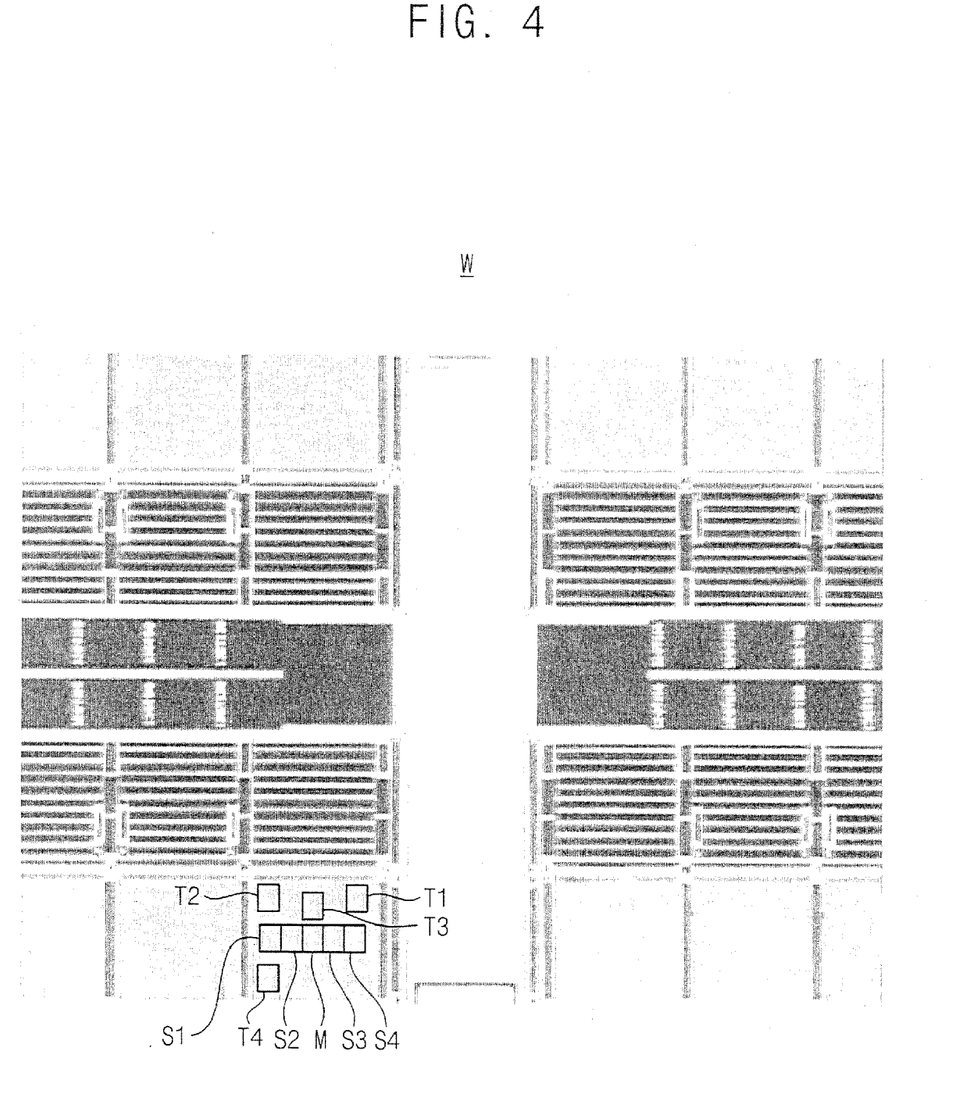
FIG. 4 is a partially enlarged plan view illustrating the substrate in FIG. 3.

FIG. 4 is a partially enlarged plan view illustrating an example of the substrate in FIG. 3.

Referring to FIG. 4, the main inspection region M corresponds to a region to be inspected for defects. The sub-inspection regions correspond to comparison regions compared with the main inspection region M for recognizing the defects in the main inspection region M. The main inspection region M and the sub-inspection regions may be selected among all inspection regions in a single die or a single chip. In this example embodiment, the sub-inspection regions include first and second sub-inspection regions S1 and S2 positioned on a left side of the main inspection region M, and third and fourth sub-inspection regions S3 and S4 positioned on a right side of the main inspection region M. Although the sub-inspection regions include the first, second, third and fourth sub-inspection regions S1, S2, S3 and S4 in this example embodiment, the present invention is not restricted within the numbers and the positions of the sub-inspection regions.

In this example, the minute structures having a substantially similar regularity are formed on the main inspection region M and the sub-inspection regions S1, S2, S3 and S4. The minute structures may also be repeatedly formed on each of the main inspection region M and the sub-inspection regions S1, S2, S3 and S4. Examples of the minute structures include a conductive layer pattern, an insulation layer pattern, a contact hole, a conductive wiring, etc.

The main image of the main inspection region M and the sub-images of the sub-inspection regions S1, S2, S3 and S4 obtained using the image-obtaining unit 110 are stored in the memory 170. Alternatively, the processing unit 130 may process the main image and the sub-images to convert the main image and the sub-images into gray level signals. The gray level signals may be stored in the memory 170.

The processing unit 130 may obtain an average image of the main image of the main inspection region M and the sub-images of the sub-inspection regions S1, S2, S3 and S4. The processing unit 130, in the present embodiment, includes a first processing part 135, a second processing part 140 and a third processing part 145.

The first processing part 135 continuously calculates a main gray level value by pixels based on image information of the main inspection region M to create a main gray level signal of the main inspection region M. Further, the first processing part 135 continuously calculates sub-gray level values by pixels based on image information of the sub-inspection regions S1, S2, S3 and S4 to create sub-gray level signals of the sub-inspection regions S1, S2, S3 and S4. Here, each of the gray level signals may be represented as a gray value in a range between 0 and 255.

The second processing part 140 averages the main gray level signal of the main inspection region M and the sub-gray level signals of the sub-inspection regions S1, S2, S3 and S4 to create an average gray level signal. Particularly, the second processing part 140 continuously calculates an average gray level value $F_{Ag}$ based on the following Equation 1 to create the average gray level signal.

$$F_{Ag}=(F_{n-2}+F_{n-1}+F_n+F_{n+1}+F_{n+2})/5 \qquad \text{Equation 1}$$

In Equation 1, $F_{Ag}$ represents the average gray level value, $F_n$ indicates the main gray level value of the main inspection region M, and $F_{n-2}$, $F_{n-1}$, $F_{n+1}$ and $F_{n+2}$ represent the sub-gray level values of the sub-inspection regions S1, S2, S3 and S4, respectively.

The third processing part 145 converts the average gray level signal into an image to create an average image. Here, the first processing part 135 creates the gray level signals from the main image of the main inspection region M and the sub-images of the sub-inspection regions S1, S2, S3 and S4. On the other hand, the third processing part 145 creates the average image from the average gray level signal. That is, the operation of the third processing part 145 is different from that of the first processing part 135. The average image created by the third processing part 145 is transmitted to the image processor 125. The image processor 125 converts the average image into image data. The image data is displayed on the display panel 128 as an image.

The average image mainly includes the image data with respect to common defects existing in the main inspection region M and the sub-inspection regions S1, S2, S3 and S4. On the contrary, the average image rarely includes image data with respect to non-common defects. For example, the average image includes the image data with respect to the common defects on the minute structure commonly existing in the main inspection region M and the sub-inspection regions S1, S2, S3 and S4. However, the average image displays image data reduced to a size of about ⅕ times the original image data with respect to the non-common defects that exist only in the main inspection region M or any one among the sub-inspection regions S1, S2, S3 and S4. Here, the non-common defects correspond to noise. Thus, the average image rarely includes the image data with respect to noise. The average image created by the processing unit 130 is transmitted to the detecting unit 150 simultaneously with being stored in the memory 170.

The detecting unit 150 compares the average image with the main image of the main inspection region M to detect the defects on the main inspection region M. The detecting unit 150 includes a first detecting part 155, a second detecting part 160, and a third detecting part 165.

The first detecting part 155 is selectively used for calculating an average gray level signal of the average image and a main gray level signal of the main inspection region M. Particularly, this calculation can occur when the main gray level signal of the main inspection region M created by the first processing part 135 and the average gray level signal of the average image created by the second processing part 140 are not stored in the memory 170.

The second detecting part 160 calculates a difference between the average gray level signal of the average image and the main gray level signal of the main inspection region M. For example, the second detecting part 160 aligns a peak point on the average gray level signal of the average image with a peak point on the main gray level signal of the main inspection region M. The second detecting part 160 then overlaps the average gray level signal with the main gray level signal. The second detecting part 160 detects a section where the difference on the overlapped gray level signals is beyond a predetermined error range.

The third detecting part 165 finds a position on the substrate W corresponding to the section where the difference is beyond the predetermined error range to recognize defects in the main inspection region M.

Here, the average gray level signal of the average image and the main gray level signal of the main inspection region M are obtained from a same object, that is, the substrate W, so that the average gray level signal and the main gray level signal have an identity. The identity means that the average gray level signal and the main gray level signal are identically changed. The section where the difference between the average gray level signal of the average image and the main gray level signal of the main inspection region M is generated corresponds to a section where abnormally generated defects exist. As described above, the third detecting part 165 finds the position on the substrate W corresponding to the section where the defect is in the main inspection region M. The third detecting part 165 matches the main gray level signal of the main inspection region M with coordinate information of the substrate W to find the section where the defect is predicted.

Additionally, the third detecting part 165 may further include a module for classifying the defects. The module may recognize whether the detects are generated based on the coordinate information. Further, the module may calculate sizes of the defects based on the coordinate information. The module may classify the defects based on the recognition and the sizes of the defects. Thus, the defects may be automatically detected and classified so that process lines for a semiconductor device may be automated and improved.

Figure 5:
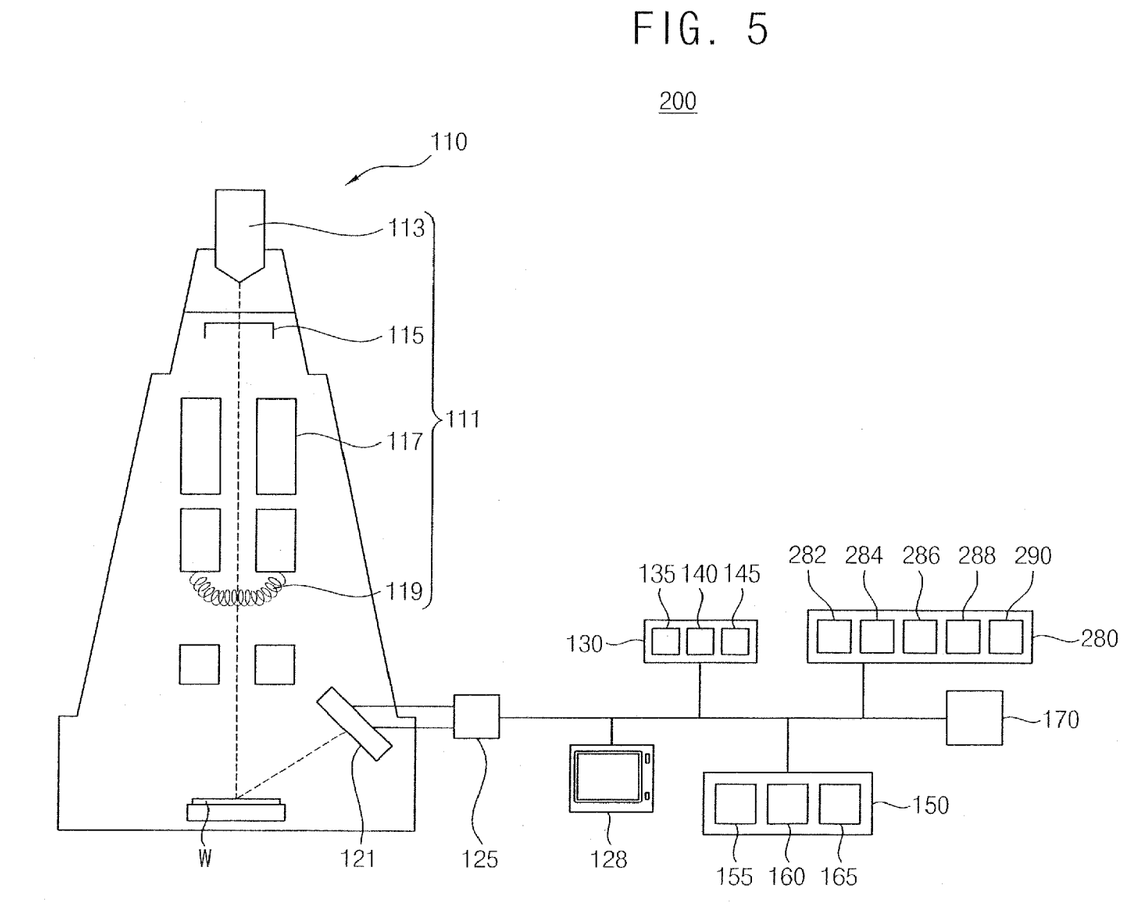
FIG. 5 is a block diagram illustrating an apparatus for inspecting a substrate in accordance with another example embodiment of the present invention.

FIG. 5 is a block diagram illustrating an apparatus for inspecting a substrate in accordance with another example embodiment of the present invention.

An apparatus 200 of the present example embodiment includes elements substantially same as those of the apparatus 100 in FIG. 3 except for a standardizing unit 280. Thus, same reference numerals refer to the same elements and any further illustrations with respect to the same elements are omitted.

Referring to FIG. 5, the standardizing unit 280 includes a first standardizing part 282, a second standardizing part 284, a third standardizing part 286, a fourth standardizing part 288 and a fifth standardizing part 290.

The first standardizing part 282 randomly selects a plurality of reference inspection regions T1, T2, T3 and T4 among all inspection regions on the substrate W. The reference inspection regions T1, T2, T3 and T4 may not be continuously arranged adjacent to the main inspection region M (e.g. contiguous with region M or contiguous with a region which is itself contiguous with region M). Further, the reference inspection regions T1, T2, T3 and T4 may be selected from dies or chips. Furthermore, the number of the reference inspection regions may be at least two. Although the reference inspection regions include the four regions T1, T2, T3 and T4 in this example embodiment, the present invention is not restricted within the numbers and the positions of the reference inspection regions.

The minute structures having a substantially similar regularity are formed on the main inspection region M and the reference inspection regions T1, T2, T3 and T4. The minute structures may be repeatedly formed on the main inspection region M and the reference inspection regions T1, T2, T3 and T4. Examples of the minute structures include a conductive layer pattern, an insulation layer pattern, a contact hole, a conductive wiring, etc.

The second standardizing part 284 obtains reference images of the reference inspection regions T1, T2, T3 and T4. The second standardizing part 284 may obtain the reference images of the reference inspection regions T1, T2, T3 and T4 using the image-obtaining unit 110. The second standardizing part 284 continuously calculates reference gray level values using pixels based on the reference images of the reference inspection regions T1, T2, T3 and T4 to create reference gray level signals of the reference inspection regions T1, T2, T3 and T4.

The third standardizing part 286 averages the reference images of the reference inspection regions T1, T2, T3 and T4 to obtain an average reference image. Particularly, the third standardizing part 286 averages the reference gray level signals of the reference inspection regions T1, T2, T3 and T4 to create an average reference gray level signal. The third standardizing part 286 converts the average reference gray level signal into an image to create an average reference image. The average reference image created by the third standardizing part 286 may be transmitted to the image processor 125 and simultaneously stored in the memory 170. The image processor 125 converts the average reference image into reference image data. The reference image data is displayed on the display panel 128 as an image.

The average reference image mainly includes the image data with respect to common defects existing in the main inspection region M and the reference inspection regions T1, T2, T3 and T4. Although the average reference image may include noise much more than those in the average image, the average reference image is used as a comparison image for recognizing whether the defects are generated in the main inspection region M.

The fourth standardizing part 288 calculates a difference between the average reference image and the average image, which is calculated using the sub-inspection regions S1, S2, S3 and S4. Particularly, the fourth standardizing part 288 aligns a peak point on the average reference gray level signal of the average reference image with a peak point on the average gray level signal of the average image. The fourth standardizing part 288 then overlaps the average reference gray level signal with the average gray level signal. The fourth standardizing part 288 detects an aligned degree between the average reference gray level signal and the average gray level signal.

Here, since the average image includes noise less than that in the average reference image, the average image is different from the average reference image. However, the average image and the average reference image are obtained from a same object, that is, the substrate W, so that the average image and the average reference image have an identity. When a difference between the average image and the average reference image is beyond the predetermined error range, this may mean that any one of the average image and the average reference image is abnormal. That is, this may not mean that the defects exist only in any one of the average image and the average reference images.

Further, the average reference image is obtained from the reference inspection regions T1, T2, T3 and T4 randomly selected among all inspection regions. On the contrary, the average image is obtained from the sub-inspection regions S1, S2, S3 and S4 adjacent to the main inspection region M. Thus, a possibility of generating abnormality in the average reference image is lower than that of generating abnormality in the average image.

The fifth standardizing part 290 determines whether the average image is replaced with the average reference image according to the aligned degree between the average reference image and the average image. Particularly, when a difference between the average image and the average reference image is beyond the predetermined error range, the average image is determined to be abnormal. The fifth standardizing part 290 replaces the average image as the comparison image of the main image of the main inspection region M with the average reference image. That is, the detecting unit 150 compares the average reference image with the main image of the main inspection region M to detect the defects in the main inspection region M.

Figure 6:
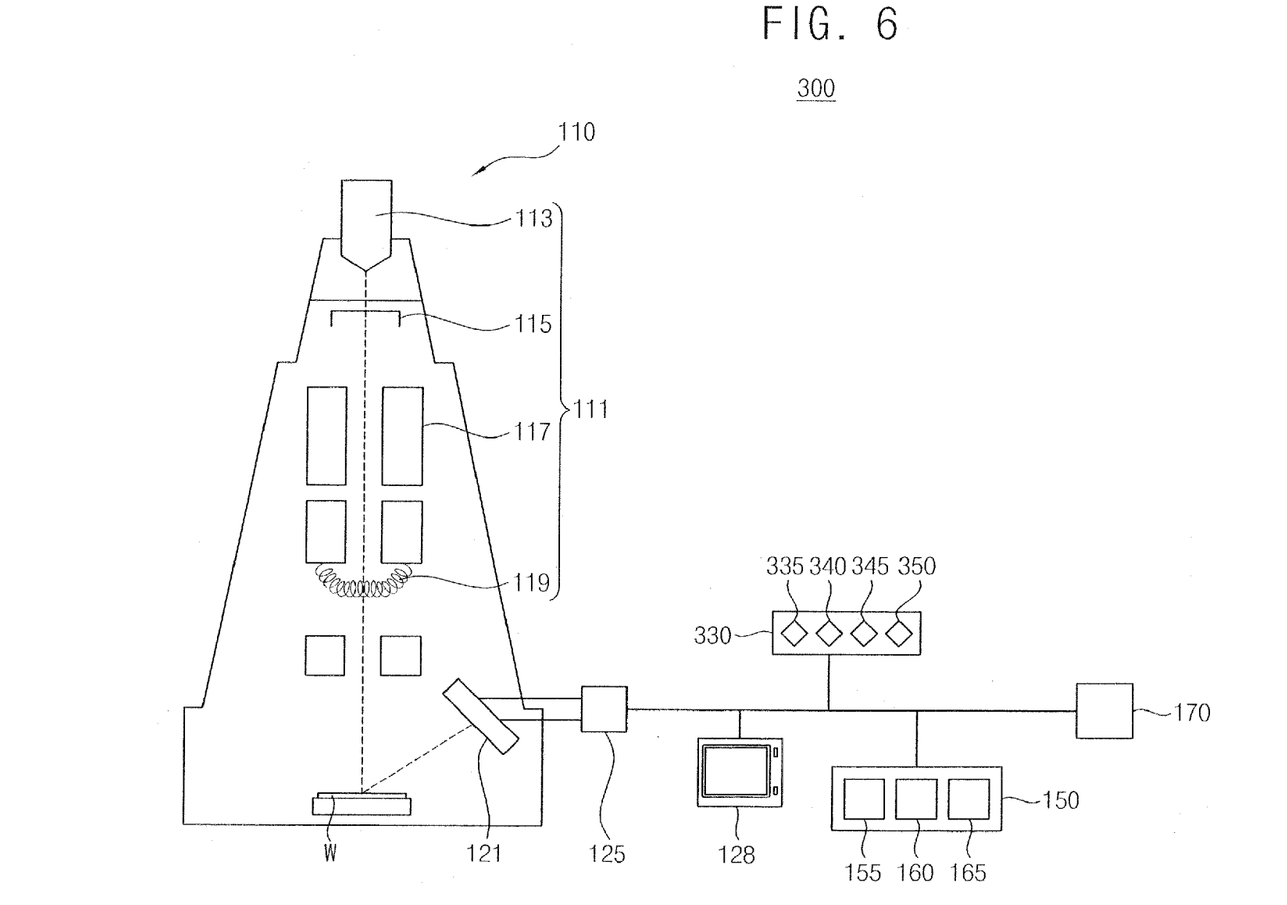
FIG. 6 is a block diagram illustrating an apparatus for inspecting a substrate in accordance with still another example embodiment of the present invention.

FIG. 6 is a block diagram illustrating an apparatus for inspecting a substrate according to still another example embodiment of the present invention.

An apparatus 300 of the present example embodiment includes elements substantially same as those of the apparatus 100 in FIG. 3 except for a processing unit 330. Thus, same reference numerals refer to the same elements and any further illustrations with respect to the same elements are omitted.

Referring to FIG. 6, the processing unit 330 includes a first processing part 335, a second processing part 340, a third processing part 345, and a fourth processing part 350.

The first processing part 335 continuously calculates a main gray level value by pixels based on image information of the main inspection region M to create a main gray level signal of the main inspection region M. Further, the first processing part 335 continuously calculates sub-gray level values by pixels based on image information of the sub-inspection regions S1, S2, S3 and S4 to create sub-gray level signals of the sub-inspection regions S1, S2, S3 and S4. Here, each of the gray level signals may be represented as a gray value from 0 to 255.

The second processing part 340 selects a maximum gray level signal or a minimum gray level signal among the main gray level signal of the main inspection region M and the sub-gray level signals of the sub-inspection regions S1, S2, S3 and S4. Here, the second processing part 340 may calculate total gray level values of the gray level signals to select the maximum gray level signal or the minimum gray level signal. Alternatively, the second processing part 340 may calculate average gray level values of the gray level signals to select the maximum gray level signal or the minimum gray level signal. A gray level signal excluded from the average gray level signal may correspond to the maximum gray level signal or the minimum gray level signal. In other words, a gray level signal having the largest deviation may preferably be selected as the excluded gray level signal.

The third processing part 345 averages the main gray level signal of the main inspection region M and the sub-gray level signals of the sub-inspection regions S1, S2, S3 and S4 to create an average gray level signal. Particularly, the third processing part 345 continuously calculates an average gray level value $F_{Ag}$ based on a following Equation 2 to create the average gray level signal.

$$F_{Ag} = ((F_{n-2} + F_{n-1} + F_n + F_{n+1} + F_{n+2}) - F_{min/max})/4 \qquad \text{Equation 2}$$

In Equation 2, $F_{Ag}$ represents the average gray level value, $F_n$ indicates the main gray level value of the main inspection region M, $F_{n-2}$, $F_{n-1}$, $F_{n+1}$ and $F_{n+2}$ represent the sub-gray level values of the sub-inspection regions S1, S2, S3 and S4, respectively, and $-F_{min/max}$ indicates a maximum value or a minimum value among $F_{n-2}$, $F_{n-1}$, $F_{n+1}$ and $F_{n+2}$.

The average gray level signal is calculated by averaging the main gray level signal of the main inspection region M and the sub-gray level signals of the sub-inspection regions S1, S2, S3 and S4 excluding the maximum gray level signal or the minimum gray level signal having the largest deviation.

Here, since the gray level signal having the largest deviation is excluded in creating the average gray level signal, the average image mainly includes the image data with respect to defects commonly existing in the main inspection region M and the sub-inspection regions S1, S2, S3 and S4. On the contrary, the average image rarely includes image data with respect to non-common defects. Thus, the average gray level signal may have improved characteristics.

The fourth processing part 350 converts the average gray level signal into an image to create an average image. The average image created by the fourth processing part 350 may be transmitted to the image processor 125. The image processor 125 converts the average image into image data. The image data may be displayed on the display panel 128 as an image.

According to the above-mentioned example embodiments, the average image compared with the image of the selected inspection region may have greatly reduced noise so that the defects such as particles, scratches, voids, bridges, sinks, distortions of the minute structure, etc., in the selected inspection region may be rapidly and accurately detected.

Figure 7:
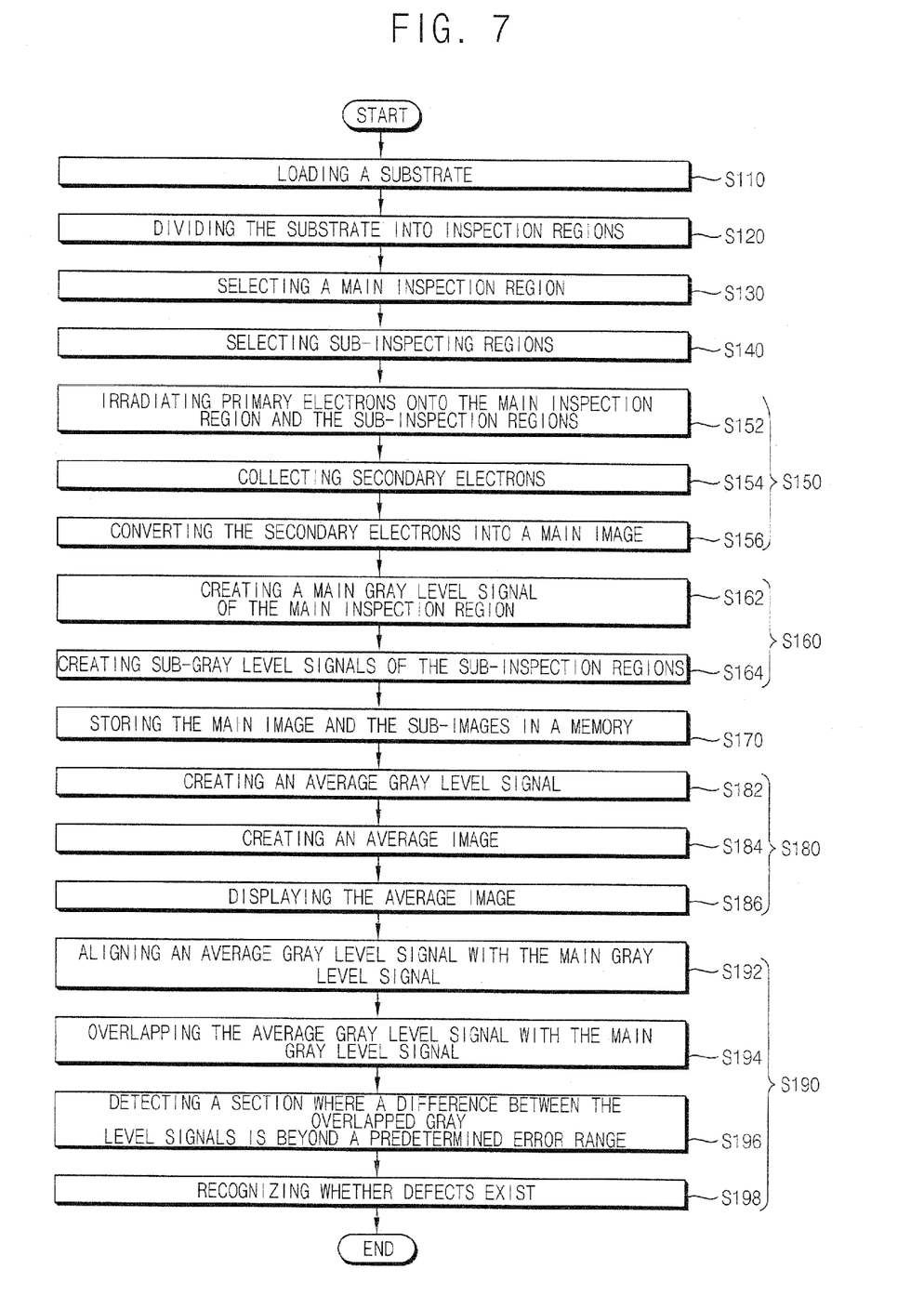
FIG. 7 is a flow chart illustrating a method of inspecting a substrate in accordance with a yet another embodiment of the present invention.

FIG. 7 is a flow chart illustrating a method of inspecting a substrate using the apparatus in FIG. 3 in accordance with yet another embodiment of the present invention.

Referring to FIGS. 3 and 7, in step S110, the substrate W is loaded into the apparatus 100. Here, the minute structures of a device are formed on the substrate W.

In step S120, the substrate W is divided into a plurality of inspection regions. Here, the inspection regions may have substantially the same area. Further, the area of each of the inspection regions may be below a maximum area for allowing the image-obtaining unit 110 to obtain the image. Furthermore, the inspection regions may be set on the substrate W by territories. For example, the inspection regions are differently set on the substrate W by dies or cells.

In step S130, the main inspection region M is selected among all inspection regions.

In step S140, the sub-inspection regions S1, S2, S3 and S4 adjacent to the main inspection region M are selected among all inspection regions. Here, the main inspection region M corresponds to a region to be inspected for defects. The sub-inspection regions correspond to comparison regions that are compared with the main inspection region M for recognizing defects in the main inspection region M. Further, the sub-inspection regions S1, S2, S3 and S4 may include the minute structures having substantially the same regularity that is similar to those in the main inspection region M. For example, the sub-inspection regions include first and second sub-inspection regions S1 and S2 positioned on a left side of the main inspection region M, and third and fourth sub-inspection regions S3 and S4 positioned on the right side of the main inspection region M. The number of the sub-inspection regions may be at least two. The higher the number of sub-inspection regions S1, S2, S3 and S4 that are selected, the more accurate is the defect-detecting process. Having considered an efficiency of the defect-detecting process, the number of the sub-inspection regions S1, S2, S3 and S4 is preferably four.

In step S150, the image-obtaining unit 110 obtains the main image of the main inspection region M and the sub-images of the sub-inspection regions S1, S2, S3 and S4. Particularly, in step S152, the electron emitter 111 emits the accelerated primary electrons onto the main inspection region M and the sub-inspection regions S1, S2, S3 and S4. In step S154, the detector 121 collects the secondary electrons released from the substrate W. In step S156, the image processor 125 displays the secondary electrons as an image, thereby obtaining the main image of the main inspection region M and the sub-images of the sub-inspection regions S1, S2, S3 and S4.

Here, the above-mentioned operational principle of the image-obtaining unit 110 is substantially similar to that of an SEM. Thus, the main image of the main inspection region M and the sub-images of the sub-inspection regions S1, S2, S3 and S4 may be obtained using the SEM.

In step S170, the main image of the main inspection region M and the sub-images of the sub-inspection regions S1, S2, S3 and S4 are stored in the memory 170. Here, the main image of the main inspection region M and the sub-images of the sub-inspection regions S1, S2, S3 and S4 may be converted into a main gray level signal and sub-gray level signals, respectively. The main gray level signal and the sub-gray level signals may also be stored in the memory 170.

To convert the main image and the sub-images into the main gray level signal and the sub-gray level signals, respectively, in step S160, the processing part 130 converts the main image of the main inspection region M and the sub-images of the sub-inspection regions S1, S2, S3 and S4 into the main gray level signal and the sub-gray level signals, respectively.

Particularly, in step S162, the main gray level value by the pixels of the main inspection region M is continuously calculated to create the main gray level signal of the main inspection region M. In step S164, the sub-gray level values by the pixels of the sub-inspection regions S1, S2, S3 and S4 are continuously calculated to create the sub-gray level signals of the sub-inspection regions S1, S2, S3 and S4.

In step S180, the average image of the main image and the sub-images in the memory 170 is obtained. Particularly, the main gray level signal of the main inspection region M and the sub-gray level signals of the sub-inspection regions S1, S2, S3 and S4 are averaged to create the average gray level signal. Here, the average gray level value may be continuously calculated using Equation 1 or 2 to create the average gray level signal. In step S184, the average gray level signal is converted to create the average image. The average image may be displayed on the display panel 128 as the image.

The average image mainly includes the image data with respect to common defects that are commonly in the main inspection region M and the sub-inspection regions S1, S2, S3 and S4. On the contrary, the average image rarely includes the image data with non-common defects. In other words, the average image rarely includes the image data with respect to noise.

In step S190, the detecting unit 150 compares the average image with the main image of the main inspection region M to detect the defects in the main inspection region M. To detect the defects, in step S192, the peak point on the average gray level signal of the average image is aligned with that on the main gray level signal of the main inspection region M. In step S194, the average main gray level signal is overlapped with the main gray level signal. In step S196, a section where the difference between the overlapped gray level signals is beyond a predetermined error range is found. In step S198, a position of the substrate W corresponding to the section where the difference is beyond the predetermined error range is used to recognize whether there are defects on the main inspection region M. Here, the section where the difference between the overlapped gray level signals exists corresponds to a section where the defects are to be generated. The position of the substrate W corresponding to the section is found to recognize the defects in the main inspection region M.

After the above-mentioned inspection process with respect to the main inspection region M is completed, another inspection region is then set as the main inspection region M. The above-mentioned process is carried out on the new main inspection region M.

Alternatively, to effectively detect defects, the reference inspection regions are randomly selected among all inspection regions. The reference images of the reference inspection regions are obtained. The reference images are averaged to obtain the average reference image. The difference between the average reference image and the average image is then calculated. The average image is replaced with the average reference image in accordance with the aligned degree between the average image and the average reference image. When the difference between the average image and the average reference image is beyond the predetermined error range, the average image is determined to be abnormal. The average image is replaced with the average reference image, thereby improving reliability of the inspection process. Methods of obtaining the average image and the average reference image are substantially similar to those illustrated with reference to FIG. 5. Thus, any further illustrations with respect to the methods are omitted.

Further, to more effectively detect defects, the image information of the main inspection region M and the sub-inspection regions S1, S2, S3 and S4 is obtained. Any one having the largest deviation among the image information is selected. Average image information is created based on remaining image information excluding for the selected image information to improve the characteristics of the average image information. A method of obtaining the average image information is substantially similar to that illustrated with reference to FIG. 6. Thus, any further illustration with respect to the method is omitted herein.

According to the present invention, the average image compared with the main image of the main inspection region may have improved characteristics. Thus, the defects in the main inspection region may be accurately and rapidly detected. As a result, a process for inspecting the substrate may have improved reliability. Further, the number of inspecting processes for the substrate may be reduced so that a cost for a reviewing tool used for the reviewing process may be remarkably reduced. Furthermore, a line for the inspection process may be automated so that a worker-free line may be established.

Having described the preferred embodiments of the present invention, it is noted that modifications and variations can be made by persons skilled in the art in light of the above teachings. It is therefore to be understood that changes may be made in the particular embodiment of the present invention disclosed which is within the scope and the spirit of the invention outlined by the appended claims.

What is claimed is:

1. A method of inspecting a substrate, comprising:
dividing the substrate into inspection regions;
selecting a main inspection region among the inspection regions;
obtaining, with an image obtaining unit, a main image of the main inspection region and sub-images of sub-inspection regions adjacent to the main inspection region;
obtaining, with a processing unit, an average image of the main image and the sub-images;
randomly selecting reference inspection regions among the inspection regions;
obtaining a reference image of each of the reference inspection regions;
averaging the reference images to obtain an average reference image;
calculating a first difference, the first difference between the average reference image and the average image;
replacing the average image with the average reference image when the first difference is beyond a first error range; and
detecting defects in the main inspection region, the defects detected by comparing the average image with the main image when the first difference is within the first error range and comparing the average reference image with the main image when the first difference is beyond the first error range.

2. The method of claim 1, wherein the main image and the sub-images are obtained using a scanning electron microscope (SEM).

3. The method of claim 1, wherein detecting the defects comprises:
calculating an average gray level, the average gray level of the average image when the first difference is within the first error range and of the average reference image when the first difference is beyond the first error range;
calculating a main gray level of the main image;
calculating a second difference, the second difference between the average gray level and the main gray level;
recognizing a section on the main image where the second difference is beyond a second error range; and
finding a position on the substrate corresponding to the section.

4. The method of claim 1, wherein obtaining the average image comprises:
calculating a main gray level of the main inspection region and sub-gray levels of the sub-inspection regions;
averaging the main gray level and the sub-gray levels to obtain an average gray level; and
converting the average gray level into the average image.

5. The method of claim 1, wherein obtaining the average image comprises:
calculating a main gray level of the main inspection region and sub-gray levels of the sub-inspection regions;
selecting a maximum gray level or a minimum gray level among the main gray level and the sub-gray levels;
averaging remaining gray levels after excluding the selected maximum or minimum gray level to obtain an average gray level; and
converting the average gray level into the average image.

6. An apparatus for inspecting a substrate, comprising:
an image-obtaining unit for obtaining a main image of a main inspection region selected among inspection regions on the substrate and for obtaining sub-images of sub-inspection regions adjacent to the main inspection region;
a processing unit for obtaining an average image of the main image and the sub-images;
a first standardizing part for randomly selecting reference inspection regions among the inspection regions;
a second standardizing part for obtaining reference images of the reference inspection regions;
a third standardizing part for obtaining an average reference image by averaging the reference images;
a fourth standardizing part for calculating a difference between the average reference image and the average image;
a fifth standardizing part for replacing the average image with the average reference image when the difference is beyond a first error range; and
a detecting unit for detecting defects in the main region, the defects detected by comparing the average image with the main image when the difference is within the first error range and comparing the average reference image with the main image when the difference is beyond the first error range.

7. The apparatus of claim 6, wherein the image-obtaining unit comprises a scanning electron microscope (SEM).

8. The apparatus of claim 6, wherein the detecting unit comprises:
- a first detecting part for calculating an average gray level, the average gray level of the average image when the difference is within the first error range and of the average reference image when the difference is beyond the first error range, and calculating a main gray level of the main image;
- a second detecting part for comparing the average gray level with the main gray level to recognize a section where a difference between the average gray level and the main gray level is beyond a second error range; and
- a third detecting part to recognize where there are defects on the substrate by finding a position corresponding to the section.

9. The apparatus of claim 6, wherein the processing unit comprises:
- a first processing part for calculating a main gray level of the main image and sub-gray levels of the sub-images;
- a second processing part for calculating an average gray level by averaging the main gray level and the sub-gray levels; and
- a third processing part for converting the average gray level into the average image.

10. The apparatus of claim 6, wherein the processing unit comprises:
- a first processing part for calculating a main gray level of the main image and sub-gray levels of the sub-images;
- a second processing part for selecting a maximum gray level or a minimum gray level among the main gray level and the sub-gray levels;
- a third processing part for calculating an average gray level by averaging remaining main gray levels after excluding the selected maximum or minimum gray level; and
- a fourth processing part for converting the average gray level into the average image.

* * * * *